US012655063B2

(12) United States Patent　　(10) Patent No.: US 12,655,063 B2
Vilarinho et al.　　(45) Date of Patent: Jun. 16, 2026

(54) COMPOSITION FOR ADDITIVE MANUFACTURING BY BINDER JET PRINTING AND METHOD FOR ADDITIVE MANUFACTURING BY BINDER JET PRINTING

(71) Applicants: PORCELANAS DA COSTA VERDE S.A., Vagos (PT); UNIVERSIDADE DE AVEIRO, Aveiro (PT)

(72) Inventors: Paula Maria Lousada Silveirinha Vilarinho, Aveiro (PT); José Martinho Marques De Oliveira, Avanca (PT); Pedro Gonçalo Pereira Duarte, Luso (PT); Jorge Miguel Simões Marinheiro, Ílhavo (PT)

(73) Assignees: PORCELANAS DA COSTA VERDE S.A., Vagos (PT); UNIVERSIDADE DE AVEIRO, Aveiro (PT)

( * ) Notice: Subject to any disclaimer, the term of this patent is extended or adjusted under 35 U.S.C. 154(b) by 14 days.

(21) Appl. No.: 18/286,115

(22) PCT Filed: Apr. 13, 2022

(86) PCT No.: PCT/PT2022/050016
§ 371 (c)(1),
(2) Date: Oct. 7, 2023

(87) PCT Pub. No.: WO2022/220700
PCT Pub. Date: Oct. 20, 2022

(65) Prior Publication Data
US 2024/0182365 A1　　Jun. 6, 2024

(30) Foreign Application Priority Data
Apr. 15, 2021　(PT) ........................................ 117178

(51) Int. Cl.
*B33Y 70/10* (2020.01)
*B28B 1/00* (2006.01)
(Continued)

(52) U.S. Cl.
CPC .............. *C04B 33/04* (2013.01); *B28B 1/001* (2013.01); *B33Y 10/00* (2014.12); *B33Y 40/10* (2020.01);
(Continued)

(58) Field of Classification Search
None
See application file for complete search history.

(56) References Cited

U.S. PATENT DOCUMENTS 5,204,055 A　　4/1993　Sachs et al.
9,908,819 B1 *　3/2018　Kollenberg ............. C04B 35/63
(Continued)

OTHER PUBLICATIONS

PCT International Search Report for International Application No. PCT/PT2022/050016, mailed Sep. 13, 2022, 8pp.
(Continued)

*Primary Examiner* — Mohammad M Ameen
(74) *Attorney, Agent, or Firm* — The Roy Gross Law Firm, LLC; Roy D. Gross

(57) ABSTRACT

Composition for additive manufacturing by binder jet printing, comprising a ceramic particulate material subjected to a heat treatment and a binder particulate material, wherein the heat treatment comprises heating a particulate ceramic material from 600 to 1200° C. for 1 to 20 h, to produce the ceramic particulate material subjected to a heat treatment and the binder particulate material is a water-soluble compound. Method for additive manufacturing by binder jet printing of a conformed object comprising repeating the steps of depositing a layer of composition of the invention on a printing bed and depositing a liquid binder.

(Continued)

The invention solves the problems of mechanical fragility of objects conformed by binder jet printing and design defects thereof, wherein the heat treatment creates bonds and aggregations between particles of the ceramic material, maintaining them during printing.

10 Claims, 6 Drawing Sheets

(51) Int. Cl.

| | |
|---|---|
| *B33Y 10/00* | (2015.01) |
| *B33Y 40/10* | (2020.01) |
| *C04B 33/04* | (2006.01) |
| *C04B 33/13* | (2006.01) |
| *C04B 33/32* | (2006.01) |
| *C04B 35/626* | (2006.01) |
| *C04B 35/634* | (2006.01) |

(52) U.S. Cl.
CPC .......... *B33Y 70/10* (2020.01); *C04B 33/1315* (2013.01); *C04B 33/32* (2013.01); *C04B 35/6265* (2013.01); *C04B 35/62675* (2013.01); *C04B 35/63416* (2013.01); *C04B 2235/3418* (2013.01); *C04B 2235/3427* (2013.01); *C04B 2235/349* (2013.01); *C04B 2235/6026* (2013.01); *C04B 2235/6567* (2013.01)

(56) References Cited

U.S. PATENT DOCUMENTS

| | | | | |
|---|---|---|---|---|
| 2011/0111990 | A1* | 5/2011 | Pershikova | ........... E21B 43/267 |
| | | | | 507/273 |
| 2011/0129640 | A1* | 6/2011 | Beall | ................. C04B 35/63492 |
| | | | | 428/116 |
| 2013/0157013 | A1* | 6/2013 | Huson | .................... B28B 1/001 |
| | | | | 501/141 |
| 2015/0232648 | A1* | 8/2015 | Hsueh | ................... B29C 64/165 |
| | | | | 106/18.33 |
| 2018/0000571 | A1* | 1/2018 | Watanabe | .............. B33Y 70/10 |

OTHER PUBLICATIONS

PCT Written Opinion for International Application No. PCT/PT2022/050016, mailed Sep. 13, 2022, 10pp.
PCT International Preliminary Report on Patentability for International Application No. PCT/PT2022/050016, issued Oct. 12, 2023, 11pp.

* cited by examiner

COMPOSITION FOR ADDITIVE MANUFACTURING BY BINDER JET PRINTING AND METHOD FOR ADDITIVE MANUFACTURING BY BINDER JET PRINTING

CROSS REFERENCE TO RELATED APPLICATIONS

This application is a National Phase of PCT Patent Application No. PCT/PT2022/050016 having International filing date of Apr. 13, 2022, which claims the benefit of priority of Portuguese Patent Application No. 117178, filed Apr. 15, 2021, the contents of which are all incorporated herein by reference in their entirety.

TECHNICAL DOMAIN

The present invention concerns a composition for the production of porcelain objects by additive manufacturing, namely by Binder Jet Printing and preparation method thereof, in addition to the printing method employing said composition.

BACKGROUND

Additive Manufacturing (hereinafter referred to as AM) refers to a group of technologies that create physical objects in 3D (three dimensions or three-dimensional), directly from CAD (Computer-Aided Design) models. AM "adds" liquids, films or laminates, yarns or powder materials, layer-by-layer, to form components or objects, with no need, or minimal need, for subsequent processing. This methodology offers several advantages, wherein total geometric design and project freedom are included, with almost 100% use of the material employed as raw material. Additionally, AM processes have a low environmental impact, as no waste is generated. Another advantage relates to the short lead times to prepare a certain part or component.

In 2009, ASTM International (American Society for Testing and Materials), presents the first ASTM standard, in order to standardizing the nomenclature in the world of layer-by-layer manufacturing. ASTM officially defined AM as a process of joining materials to fabricate objects from three-dimensional model data, usually layer upon layer, as opposed to subtractive manufacturing technologies such as traditional machining.

Although AM encompasses different processes and technologies, they all include the same sequence of steps and that consists of three basic steps. The creation of the three-dimensional digital model of the object is followed by its conversion into a Standard Tessellation Language—STL data file (step 1). For each STL file, a slicing software is responsible for "slicing the object into layers" and providing information to the AM equipment on where to deposit the material for each layer (step 2). The object is thus constructed in a layer-by-layer process (step 3). Depending on the shape of the object, the material and the technique, some post-conformation processes follow, which aim to increase the density, improve the surface finish or remove the support material. STL files are also known as "Standard Triangle Language" or "Stereolithography" files. As an alternative to STL files, a three-dimensional digital model can also be converted into files with equivalent state of the art extensions, such as: OBJ (Wavefront OBJect), AMF (Additive Manufacturing Format) and 3MF.

The different AM processes are currently grouped into seven categories: (1) Vat photopolymerization; (2) Sheet lamination; (3) Powder bed fusion; (4) Material extrusion; (5) Binder jetting; (6) Direct energy deposition; and (7) Material jetting.

Layer-by-layer fabrication allows the creation of virtually any shape and this is the great advantage of AM. With this type of manufacturing there are no restrictions on tools, it is possible to manufacture parts of high geometric complexity in a single part and in a single production step. Thus, there is no need to sacrifice the functionality of the parts for the sake of ease of manufacturing. The possibility of creating almost any shape, including objects that can in fact be very difficult to manufacture by other processes, such as machining, molding, pressing, among others, constitutes a positive feature of AM in industrial application, in terms of validation of the functionality and aesthetics in a timely manner. It should be noted that in general additive manufacturing equipment's allows designers and project planners to produce conceptual parts and models in a short time and at low cost, using bench-top equipment. In addition, it is possible to manufacture a single part that exhibits different properties, for example, in terms of mechanical properties, flexibility can be given to one portion of the part and rigidity to another. AM opens up unique opportunities for the development of unique objects, hitherto impossible to develop and for applications. A paradigmatic example of this ability of AM to enhance the manufacture of objects that have not yet been manufactured, is the fabrication of human tissues (tissue engineering construct—TEC) (bioprinting).

Conventional subtractive manufacturing processes normally require complementary resources for grinding, finishing, assembly, for example, cutting tools, grinders, among others, in addition to the main processing tool equipment. On the one hand, because they are manufactured layer by layer already with the final shape and, on the other hand, because complex objects and structures can be manufactured, the parts produced by AM do not require, in most cases, additional processing resources. This shortens the processing times of objects and parts and facilitates the implementation of manufacturing small batches of parts. Conventional techniques, such as injection molding, are less expensive for the manufacture of products in large quantities, namely polymer-based products, while AM can be faster, more flexible and more economical, although it produces relatively small quantities of parts. As a result of this ease of manufacturing, along with the portability of printing equipment, parts can be manufactured by more manufacturers, manufacturers closer to customers, and manufacturing moves downstream, closer and closer to the consumer, allowing manufacturing of products or product families, which respond to the requirements of individual consumers. This fact represents a change with a drastic improvement in the dynamics of the supply chain, with a consequent saving of resources and leading to sustainable manufacturing.

Unlike subtractive manufacturing, where a large amount of material needs to be removed or is wasted, AM makes efficient use of raw materials, where leftover or residual materials can be reused with minimal processing.

AM equipment does not require expensive setup and therefore makes small-batch productions cost-effective. On the other hand, the quality of the parts depends directly on the process and not so much on the skills of the operator. As such, production can be easily synchronized with customer needs. In addition, line balancing problems and production bottlenecks are virtually eliminated, as complex parts are produced as single parts, in a single step. It should also be noted that AM technologies are very complementary to the reverse engineering process to reproduce or repair objects, models or structures.

AM comprises a set of technologies under development and whose appearance dates back to the eighties, to create three-dimensional objects layer by layer, from CAD models. Initially developed to support engineers in the product design phase, to produce models and prototypes of parts, it was called rapid prototyping during that period. However, as far as its practical application is concerned, AM is currently at the forefront of technology in different areas such as industry, healthcare and the arts.

Rapid prototyping has emerged as a means to accelerate the time-consuming, costly, and iterative process of product design, reducing time-to-market, improving quality, and reducing costs, by printing physical prototypes directly from three-dimensional data computer aided (CAD). In addition, rapid prototyping offered designers the opportunity to quickly execute multiple design iterations and conduct market research. This benefit has become even more relevant today, with the reduction of product life cycles and the growing need for companies to develop, almost continuously, new products in order to remain competitive.

Metals and polymers are currently the two major groups of materials most used by the AM industry, which is related, on the one hand, to the suitability of these materials to a wide range of current AM technologies and, on the other hand, to their applications. The AM of polymeric materials almost always results in a finished product, with limited recourse to post-processing steps. Although this is not the reality for metallic materials, their "workability" by AM is already important and, using techniques such as SLM (selective laser melting) and others, an almost finished product is obtained, or with little recourse to later steps of completion.

However, the use of ceramic materials in AM technologies is increasingly relevant. In this sense, the demand for composite and ceramic materials has also been increasing, with an emphasis on technical ceramics, such as alumina and zirconia, as well as materials for biomedical applications, such as hydroxyapatite. Therefore, the possibility of using ceramic materials in AM technologies will contribute very positively to realizing the potential of these technologies.

Binder Jetting was developed and patented by a group of MIT researchers, as revealed in US patent application U.S. Pat. No. 5,204,055 A, published Apr. 20, 1993, to Emanuel Sachs and collaborators, and it was quickly commercialized by several companies in the early 1990s.

Binder jet printing is a versatile method of printing powder materials. Any powder material that can be synthesized, deposited and bonded with a sprayable binder can be used, including plaster, sand, metal and ceramics. In AM of ceramic powders, the resulting green body is sintered, wherein the binder is pyrolyzed, to obtain the final ceramic. Binder Jet printing starts with the deposition of a layer of powder on the build platform. Then, the printheads run through the printing bed, selectively releasing the drops of binding agent according to the CAD drawing. Once the entire first layer of the object has been bonded with the binding agent, the build platform moves down, the distance corresponding to one layer in height, and a new layer of powder is deposited. This sequence is repeated until the part is conformed. When the printing process is complete, the parts are dusted off and cleaned.

Binder jet printing technology has proved to be one of the most appropriate technologies for AM of ceramics and has distinct advantages compared to other methods, because it allows the use of raw materials in powder form and the range of options for selection of raw materials is extended. Theoretically, any ceramic powder can be used to prepare ceramic preforms using binder jet printing technology. The precision and mechanical strength of ceramic pieces are closely related to powder, binder, printing parameters, equipment and post-treatments. In addition to ceramic materials, binder jet printing is also an appropriate technology for metal manufacturing, when combined with a post-sintering or infiltration step. Binder jet printing technologies have also been used to deposit photosensitive resins, which are then cured by a UV light source. An added value of this technology is the possibility of printing several materials or colours on a single layer, or the manufacture of products with functionally different materials, wherein the composition of the components gradually varies from material to material, resulting in unique properties, which cannot be by no means achieved otherwise.

Problems of the Prior Art

AM technologies that process ceramic materials present challenges related to the difficulty of processing these materials and, consequently, with the post-conforming steps necessary to achieve the desired properties. Despite the enormous potential, ceramic materials are currently the group of materials with the least expression in AM.

Although ceramic materials are already used in Binder jet printing techniques, as a consequence of the inert nature of ceramic powders, ceramic objects manufactured by binder jet printing have low mechanical strength after conformation. In order to circumvent problems arising from mechanical weaknesses, parts produced by Binder jet printing are typically post-processed, using various techniques. The low mechanical strength of the parts is related to the fragility of the parts during their handling in the production environment. An illustration of mechanical fragility occurs when a conformed part needs to be removed from the printing bed and then transported to another location in the production environment and the part suffers fractures in the course of this manipulation. State of the art conformed parts, in addition to mechanical fragility, can also have design defects after printing.

Another limitation of the binder jet printing processes known in the state of the art is the high porosity of the ceramic bodies produced, with the need for post-conforming steps in order to increase the density of the objects being recurrent.

SUMMARY OF THE INVENTION

The present invention concerns, in a first aspect, to a composition for additive manufacturing by binder jet printing, comprising a ceramic particulate material subjected to a heat treatment and a particulate binder material; wherein:

the heat treatment comprises heating a ceramic particulate material in the range of 600 to 1200° C. and for 1 to 20 h to produce the ceramic particulate material subjected to a heat treatment; and the binder particulate material is a water-soluble compound.

The present invention concerns, in a second aspect, a method of preparing a composition for additive manufacturing by binder jet printing, in accordance with the first aspect of the invention, comprising the following steps:

i. Feeding a ceramic particulate material into an oven;
ii. Heating the ceramic particulate material to a temperature in the range of 600 to 1200° C.;

iii. Carrying out the heat treatment of the ceramic particulate material in the range of 600 to 1200° C. and for 1 to 20 h;

iv. Cooling the heat-treated material in the previous step, obtaining a ceramic particulate material subjected to a heat treatment;

v. Mixing the ceramic particulate material subjected to a heat treatment with a binder particulate material, which is a water-soluble compound.

The present invention concerns, in a third aspect, to a composition for additive manufacturing by binder jet printing, characterized in that it is obtained from the method of preparation, in accordance with the second aspect of the invention.

The present invention concerns, in a fourth aspect, a method for additive manufacturing by binder jet printing of a conformed object, comprising the following steps:

a) Depositing a layer of composition for additive manufacturing by binder jet printing, in accordance with the first aspect of the invention, onto a printing bed;

b) Depositing an aqueous solution of a binder, which will cause the layer deposited in the previous step to be bound in one or more selected regions;

c) Repeating steps a) and b) a selected number of times to produce a selected number of layers, wherein successive layers are bonded together;

d) Removing the non-bonded material, eventually present in one or more regions of the object, to obtain the said conformed object.

Solution of the Problem

The present invention solves the problems of the state of the art, related to low mechanical strength and design defects of conformed objects, by means of a composition for additive manufacturing comprising a ceramic particulate material subjected to a heat treatment and a particulate binder material. The heat treatment leads to the creation of bonds between the particles of the ceramic material, causing these particles to remain aggregated, even during the course of the binder jet printing, as it prevents the dispersion of the agglomerates of the ceramic material particles in the aqueous medium related to the liquid binder employed in the additive manufacturing step.

Advantageous Effects of the Invention

The binder particulate material, included in the composition for additive manufacturing by binder jet printing according to the invention, contributes to the green parts having a high mechanical strength in terms of part handling, wherein the green parts are those conformed after deposition of said composition on the printing bed, layer by layer, while a liquid binder is deposited. The use of a water-soluble binder particulate material is necessary to impart mechanical strength to green printed objects. The use of ceramic particulate material subjected to a heat treatment, and which does not de-agglomerate in an aqueous medium, leads to faster absorption of the liquid binder in the printing bed. Additionally, the heat treatment of the ceramic particulate material contributes to the elimination of design defects in the conformed object. These combined aspects contribute to increased print quality by binder jet printing.

BRIEF DESCRIPTION OF THE FIGURES

For the purpose of promoting an understanding of the principles according to embodiments of the present invention, reference will be made to the embodiments illustrated in the figures and to the language employed to describe them. In any case, it should be understood that there is no intention to limit the scope of the present invention to the contents of the figures. Any further changes or modifications to the inventive features illustrated herein, as well as any further applications of the illustrated principles and embodiments of the invention, which would ordinarily occur to a person skilled in the art having possession of this specification, are considered to be within the scope of the claimed invention.

DESCRIPTION OF EMBODIMENTS

The present invention concerns, in a first aspect, to a composition for additive manufacturing by binder jet printing, comprising a ceramic particulate material subjected to a heat treatment and a particulate binder material; wherein:

the heat treatment comprises heating a ceramic particulate material in the range of 600 to 1200° C. and for 1 to 20 h to produce the ceramic particulate material subjected to a heat treatment; and the binder particulate material is a water-soluble compound.

Employing the ceramic particulate material subjected to heat treatment contributes to the elimination of defects in conformed objects after the process of additive manufacturing by binder jet printing.

Figure 1:
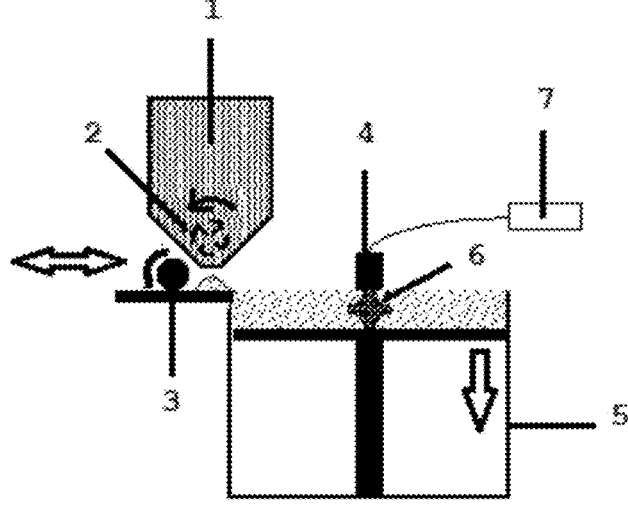
FIG. 1—Schematic representation of a three-dimensional binder jet printing equipment.

FIG. 1 shows a schematic representation of a process for additive manufacturing by binder jet printing of a conformed object, wherein a composition of the present invention is added to a reservoir (1) of composition for additive manufacturing, which has in its lower portion a system for homogenization and mixing, for example a fluidization element (2). As will be recognized by a person skilled in the art, usual particulate material mixers can be employed inside said reservoir (1). A desirable amount of composition for additive manufacturing is directed from the bottom outlet of the reservoir (1) to a printing bed (5), through the action of a printing roller (3), which has a horizontal movement in an adjacent plane and parallel to the printing bed (5). A conformed object (6) is formed inside the printing bed (5) through the deposition of the composition for additive manufacturing layer by layer, wherein the bonding and agglutination between the various layers is carried out through the deposition of a liquid binder, originally present in a reservoir of liquid binder (7) and deposited onto the composition for additive manufacturing by means of a print head (4). In order to allow the deposition of several layers of the composition for additive manufacturing and of the liquid binder, the printing bed (5) is provided with a vertical movement.

The ceramic particulate material subjected to heat treatment, present in the composition of the invention, comprises particulate materials based on oxides, clays and non-oxide materials. In preferred embodiments of aspects of the present invention, the ceramic particulate material subjected to a heat treatment is selected from the group consisting of aluminas, zirconia, zirconium silicate, alumina-zirconia, aluminosilicates, hydroxyapatite, calcium phosphate, zinc oxide, titanates, clays, carbides and nitrides and mixtures thereof. Titanates comprise, for example, barium titanate. Carbides comprise, for example, silicon carbide and tungsten carbide. Even more preferably, the ceramic particulate material subjected to a heat treatment comprises aluminas, aluminosilicates and mixtures thereof.

In preferred embodiments of aspects of the present invention, the particulate binder material is selected from the group consisting of polyvinyl alcohol (PVA), polyvinyl alcohol copolymers, sodium alginate, maltodextrin, dextrin, carbomethyl cellulose, starch, sucrose, ammonium phosphate and mixtures thereof. Even more preferably, the particulate binder material is at least one of polyvinyl alcohol, maltodextrin, carbomethyl cellulose, sodium alginate and mixtures thereof.

Preferably, the composition for additive manufacturing by binder jet printing includes the ceramic particulate material subjected to heat treatment in a proportion from 5 to 95% by mass and the particulate binder material in a proportion from 2.5 to 30% by mass, with respect to the total mass of the composition. Even more preferably, the composition for additive manufacturing by binder jet printing includes the ceramic particulate material subjected to heat treatment in a proportion from 15 to 75% by mass and the particulate binder material in a proportion from 5 to 20% by mass, with respect to the total mass of the composition. In particularly preferred embodiments, the composition for additive manufacturing by binder jet printing includes the ceramic particulate material subjected to heat treatment in a proportion from 25 to 50% by weight and the particulate binder material in a proportion from 7.5 to 15% by mass, with respect to the total mass of the composition.

Therefore, considering the preferred embodiments, with regard to the proportions of ceramic particulate material subjected to a heat treatment and of binder particulate material present in said composition, the advantageous effects of the invention are also highlighted when non-heat-treated ceramic particulate materials are used to close the mass balance of the composition submitted to the printing process.

In other alternative embodiments of aspects of the present invention, the composition for additive manufacturing by binder jet printing includes an atomized ceramic particulate material, which may be prepared from the same ceramic particulate materials from which the ceramic particulate material is obtained subjected to a heat treatment. The atomized ceramic particulate material is not heat-treated. Preferably, the atomized ceramic particulate material is selected from a group consisting of alumina, zirconia, zirconium silicate, alumina-zirconia, aluminosilicates, hydroxyapatite, calcium phosphate, zinc oxide, titanates, clays, carbides and nitrides and mixtures thereof. In these embodiments, the atomized particulate material is included in a proportion from 1 to 85% by mass, with respect to the total mass of the composition for additive manufacturing by binder jet printing. Preferably, the atomized particulate material is included in a proportion from 25 to 75% by mass, with respect to the total mass of the composition for additive manufacturing by binder jet printing. Even more preferably, the atomized particulate material is included in a proportion from 40 to 60% by mass, with respect to the total mass of the composition for additive manufacturing by binder jet printing.

The atomized ceramic particulate material can be obtained by means of an industrial atomizer, employing a ceramic suspension with a mixture of the typical raw materials of a porcelain, for example a porcelain with about 25% quartz, about 25% feldspar, about 5% clays and about 45% kaolins. The suspension is then spray processed to produce the atomized ceramic particulate material powders, using for example an atomizer nozzle with a diameter in the range of 0.7 to 3.0 mm. Other relevant operational parameters of the atomizers include the temperature setting of the atomizer chamber in the range of 200 to 500° C., the feed pressure of the ceramic particulate material paste in the range of 5 to 20 bar (500 kPa to 2000 kPa) and the depression of the fine particle cyclone in the range of 5 to 20 mmH$_2$O (49 Pa to 196 Pa). Ceramic particulate material pastes for atomization have a density from 1450 g/L to 1750 g/L. Optionally, additives are used in the ceramic particulate material pastes for atomization in order to improve the rheological properties of the ceramic suspension and/or achieve certain characteristics in the atomized powders. Industrial atomizers that can be used in the context of the present invention comprise mixed atomizers, co-current atomizers, counter-current atomizers, pressure nozzle atomizers, rotating feed disc atomizers and bifluid nozzle atomizers.

The present invention concerns, in a second aspect, a method of preparing a composition for additive manufacturing by binder jet printing comprising the following steps:

i. Feeding a ceramic particulate material into an oven;
ii. Heating the ceramic particulate material to a temperature in the range of 600 to 1200° C.;
iii. Carrying out the heat treatment of the ceramic particulate material in the range of 600 to 1200° C. and for 1 to 20 h;
iv. Cooling the heat-treated material in the previous step, obtaining a ceramic particulate material subjected to a heat treatment;
v. Mixing the ceramic particulate material subjected to a heat treatment with a binder particulate material, which is a water-soluble compound.

Preferably, the heat treatment of step iii) is carried out in the range of 850 to 1100° C. for 10 to 17 h. In particularly preferred embodiments, the temperature range is from 950 to 1050° C. and the heat treatment lasts from 14 to 16 h.

In the preferred embodiments, the atmosphere in step iii) of the heat treatment is oxidizing, in order to eliminate the organic matter possibly present in the ceramic particulate materials, namely the atomized ceramic particulate materials.

Optionally, a temperature threshold is used in stage iii) of the heat treatment, which can be extended from 1 minute to 360 minutes.

The heating rate in step ii) and the cooling rate in step iv) are variable, rates ranging from about 2° C./min to about 20° C./min can be used.

In the preferred embodiments of the method of preparing a composition for additive manufacturing by binder jet printing of the present invention, the ceramic particulate material is subjected to a heat treatment, the binder particulate material and the atomized ceramic particulate material, when included in the composition, are subjected to a sieving step prior to the step of dry mixing of the components of the composition. The sieving step comprises passing through at least one sieve, wherein the sieve with a narrower aperture allows the passage of particles with dimensions of up to 200 micrometers, preferably with dimensions of up to 150 micrometers, and even more preferably up to 100 micrometers.

The present invention concerns, in a third aspect, to a composition for additive manufacturing by binder jet printing, characterized in that it is obtained from the method of preparation, in accordance with the second aspect of the invention.

The present invention concerns, in a fourth aspect, a method for additive manufacturing by binder jet printing of a conformed object, comprising the following steps:

a) Depositing a layer of composition for additive manufacturing by binder jet printing, in accordance with the first aspect of the invention, onto a printing bed;

b) Depositing an aqueous solution of a binder, which will cause the layer deposited in the previous step to be bound in one or more selected regions;

c) Repeating steps a) and b) a selected number of times to produce a selected number of layers, wherein successive layers are bonded together;

d) Removing the non-bonded material, eventually present in one or more regions of the object, to obtain said conformed object.

In the preferred embodiments of the invention, before step a), a first step of creating a three-dimensional digital model of an object and a second step of digitally dividing into layers the three-dimensional digital model of the object are carried out. Even more preferably, the three-dimensional digital model is stored in the form of STL data, referring to specific computer programs for generating digital models for a three-dimensional printing.

In other embodiments, the liquid binder is selected from one or more of a group consisting of an aqueous solution of phosphoric acid, a solution comprising at least one alcohol and at least one ester, an aqueous solution comprising at least one alcohol, a solution aqueous solution comprising at least one saccharide, an aqueous solution comprising at least one saccharide and one disaccharide, an aqueous solution of a lactam and combinations thereof. Even more preferably, the aqueous phosphoric acid solution comprises about 5 to 20% by weight of phosphoric acid, for example 10% by weight of this inorganic acid; in the solution comprising at least one alcohol and at least one ester, the alcohol is 1-hexanol and the ester is hexyl acetate; in the aqueous solution comprising at least one alcohol, the alcohol is ethanol; in the aqueous solution comprising at least one saccharide and one disaccharide, the saccharide is dextrose and the disaccharide is sucrose; and in the aqueous solution of one lactam, the lactam is 2-pyrrolidone.

In other embodiments, after the additive manufacturing of the conformed object printed in green, at least one post-conforming step is carried out. Among the post-conforming techniques, conventional means of firing (sintering) of porcelain can be used, in order to increasing the density of the ceramic object, while conferring the mechanical resistance for its application. Other post-conforming processes may be applicable, such as hot isostatic pressing, cold isostatic pressing and infiltration with ceramic suspensions, in order to increase the density of objects. Glazing is another applicable post-conforming technique, which can be done manually or automatically by dipping into suspension of glaze, spray gun, among other industrial methods, in order to sealing the surface, increasing the hardness of the object and to give the body a glazed appearance. Other applicable post-conforming techniques aim to beautify the ceramic bodies, namely the decoration and firing of the decoration.

In the preferred embodiments of the present invention, a sintering step is performed, in order to increase the density of the object and expand the range of applications of the objects printed in green. The firing (sintering) can be carried out in two steps, the first with a maximum temperature in the range of 950 to 1050° C., for 14 to 17 h, in oxidizing atmosphere and with heating rates between 4 to 20° C./min and the second with a maximum temperature in the range of 1350 to 1450° C., for 5 to 7 h, in oxidizing atmosphere for low temperatures and in reducing atmosphere at maximum temperatures, with heating rates between 4 to 20° C./min. This heat treatment ensures that densification takes place, that is, the elimination of porosity from the conformed object, which gives it the necessary mechanical resistance for its handling and application.

Examples

Figure 2:
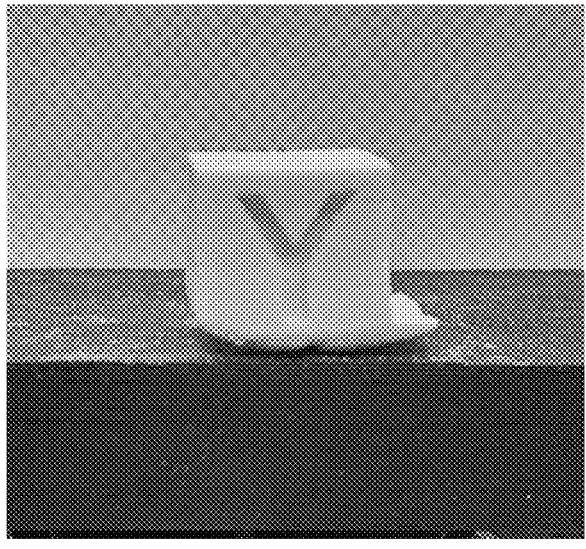
FIG. 2—illustrates an object conformed by additive manufacturing by binder jet printing wherein a composition according to the state of the art was employed.

FIG. 2 illustrates an object conformed by additive manufacturing by binder jet printing wherein a composition according to the state of the art was employed. The state of the art composition for additive manufacturing comprises 85% by weight of a non-heat-treated atomized ceramic particulate material and 15% of the PVA binder, both with a particle size below 80 micrometers. The defects observed during the printing of ceramic particulate materials without the addition of a ceramic particulate material subjected to a heat treatment are clearly observed.

The non-heat-treated atomized ceramic particulate material used in the examples shown in FIGS. 2 to 10 is a porcelain with 25% quartz, 25% feldspars, 5% clays and 45% kaolins.

Figure 3:
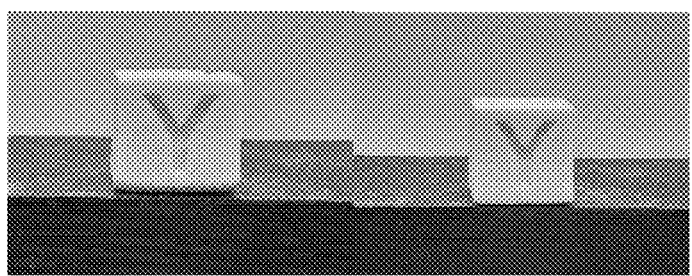
FIG. 3—illustrates objects conformed by additive manufacturing by binder jet printing wherein compositions according to the invention were employed.

FIG. 3 illustrates a green conformed object prepared by an additive manufacturing by binder jet printing method employing a composition for additive manufacturing by binder jet printing according to the invention. On the left is observed an object prepared from a mixture of particulate ceramic materials comprising 25% by weight of the composition according to the invention. On the right is observed an object prepared from a mixture of particulate ceramic materials comprising 50% by weight of the composition according to the invention. On the left side, a mixture was used with 21.25% by weight of a heat-treated ceramic particulate material, 15% by weight of PVA, the remainder being the atomized ceramic particulate material not subjected to a heat treatment. On the right side, a mixture of 42.5% by weight of heat-treated ceramic particulate material, 42.5% by weight of non-heat-treated atomized ceramic particulate material and 15% PVA was used. In both cases are noted the elimination of defects in the object in green conformed.

The ceramic particulate material subjected to a heat treatment used in the examples shown in FIGS. 2 to 10 is a porcelain with 25% quartz, 25% feldspars, 5% clays and 45% kaolins, wherein the heat treatment was carried out at 1000° C. for 16 hours.

Figure 4:
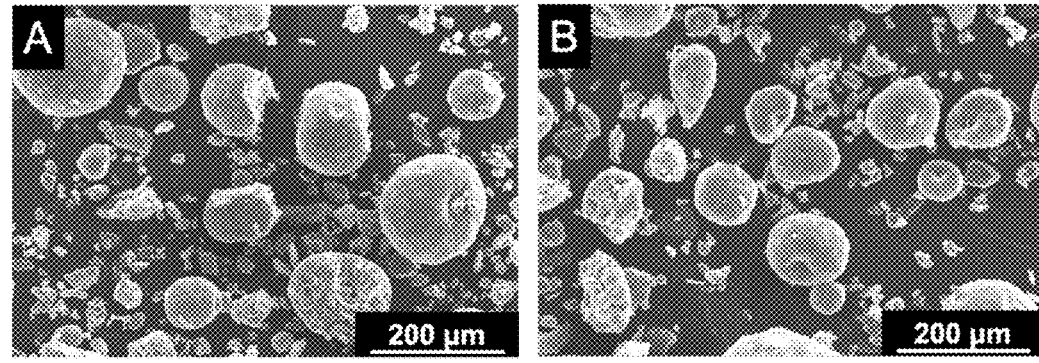
FIG. 4—illustrates micrographs of an atomized ceramic particulate material, before heat treatment, and of a ceramic particulate material subjected to a heat treatment, obtained by electron microscopy.

FIG. 4 shows micrographs of an atomized ceramic particulate material, before heat treatment (on the left) and of a ceramic particulate material subjected to a heat treatment (on the right), obtained by electron microscopy, wherein it is possible to observe that the treatment does not substantially affect the shape of the particles to be subjected to the printing process.

Figure 5:
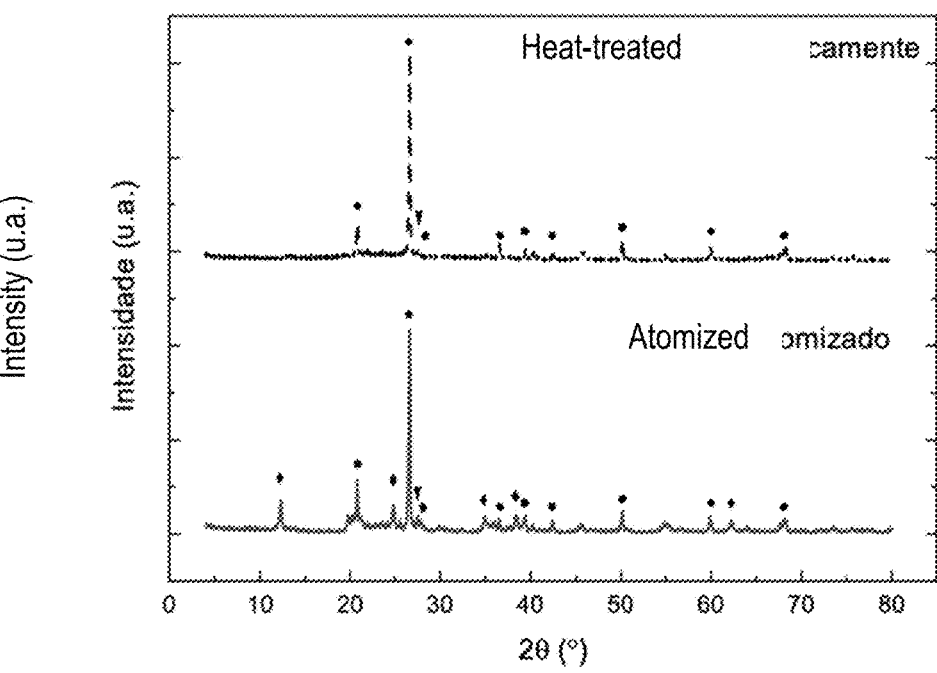
FIG. 5—illustrates a diffractogram obtained by X-ray diffraction analysis (XRD) of the crystallographic phases present in an atomized ceramic particulate material, before heat treatment, and of a ceramic particulate material submitted to a heat treatment.

FIG. 5 illustrates a diffractogram obtained by XRD analysis of the crystallographic phases present in an atomized ceramic particulate material, before heat treatment, and in a ceramic particulate material subjected to a heat treatment. This figure shows the suppression of the kaolinite phases, due to the effect of the heat treatment.

Figure 6:
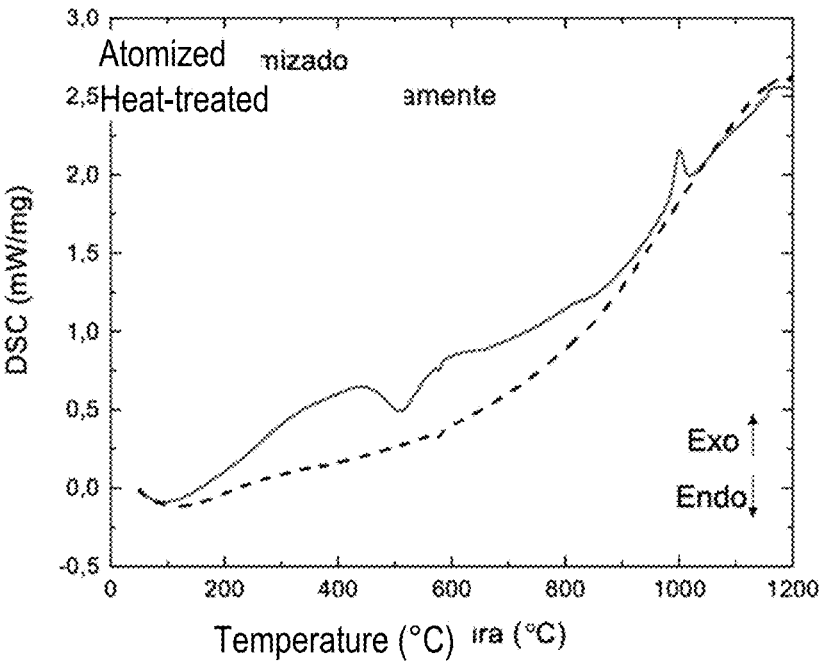
FIG. 6—illustrates a thermal analysis of differential scanning calorimetry (DSC) on an atomized ceramic particulate material, before heat treatment, and of a ceramic particulate material subjected to a heat treatment.
Figure 7:
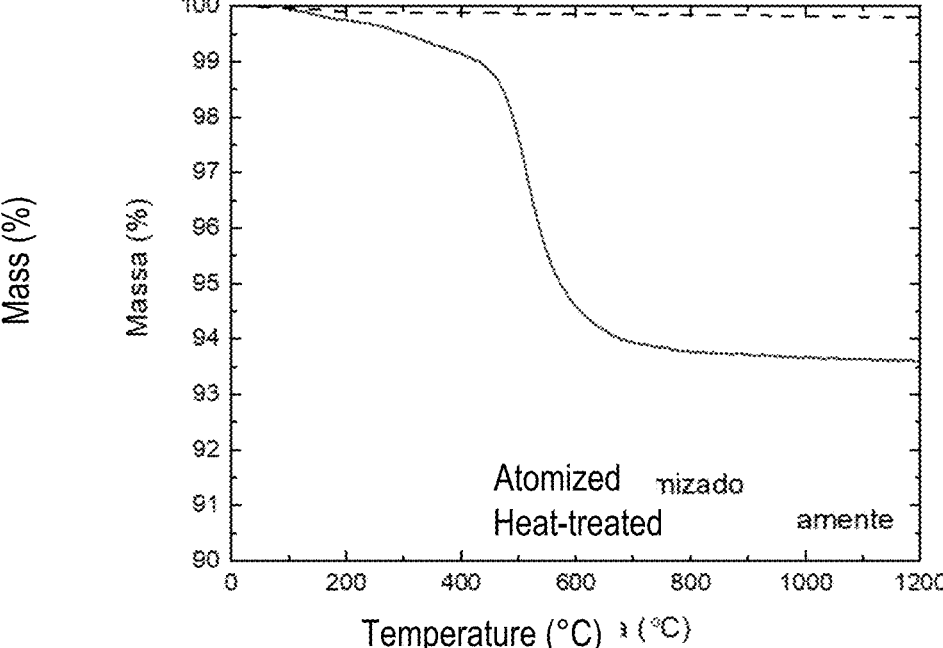
FIG. 7—illustrates a thermogravimetric analysis on an atomized ceramic particulate material, before heat treatment, and of a ceramic particulate material subjected to a heat treatment.

FIG. 6 illustrates the thermal analysis obtained by the differential scanning calorimeter (DSC) methodology and FIG. 7 illustrates the thermogravimetric analysis, both in atomized ceramic particulate material, before heat treatment, and in a particulate material ceramic submitted to a heat treatment. These analyses show that the use of heat treatment eliminates the irreversible transformations typical of ceramic particulate materials at about 550° C. and at about 990° C., and also promotes the elimination of organic matter and hydroxyl groups eventually present in the clays of ceramic materials.

Figure 8:
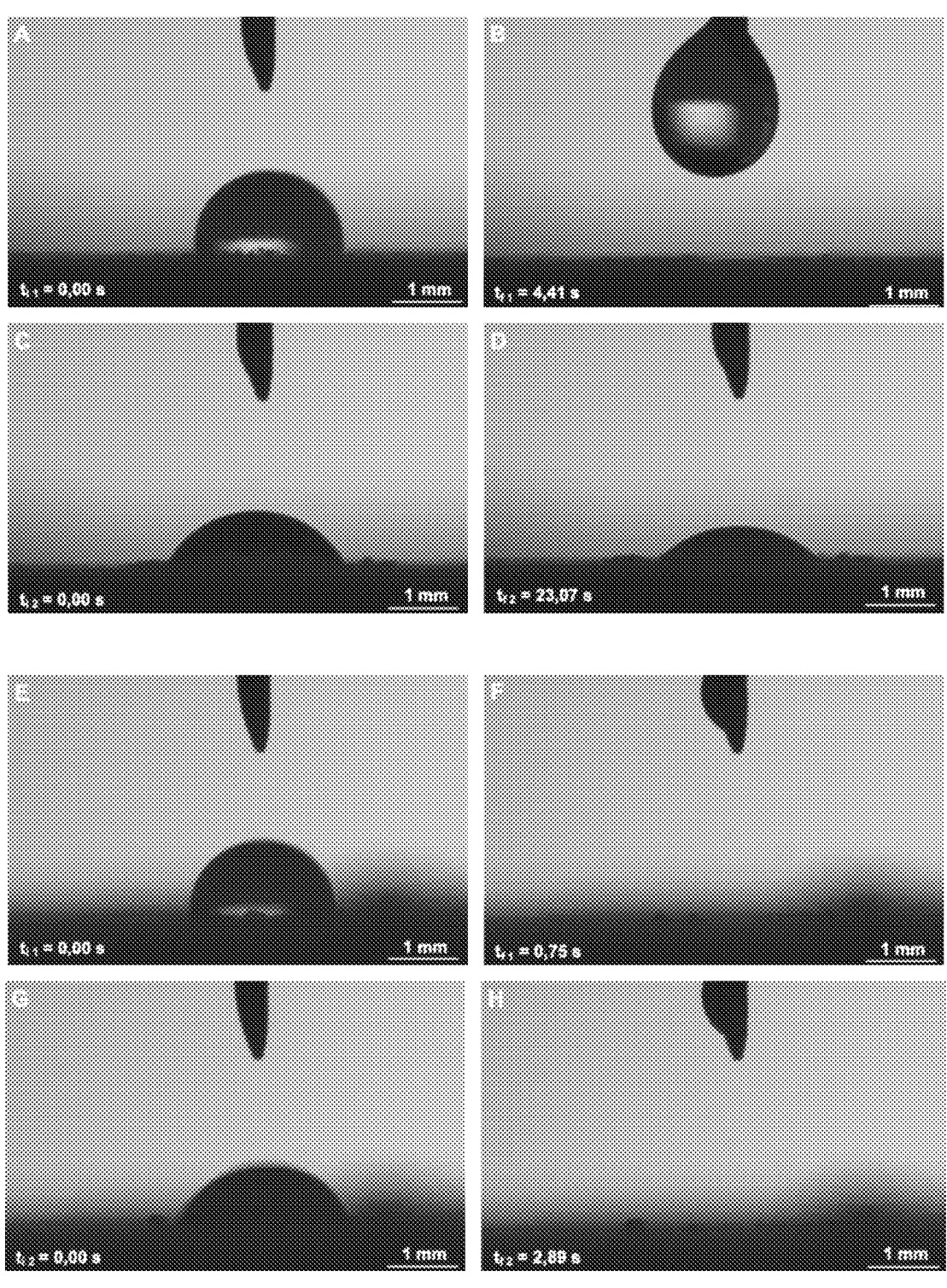
FIG. 8—illustrates a droplet absorption analysis of the liquid binder, simulating a method for additive manufacturing by binder jet printing and employing a composition according to the invention.

FIG. 8 shows a droplet absorption analysis of the liquid binder, simulating a method for additive manufacturing by binder jet printing and employing a composition according to the invention. In FIGS. 8A to 8D it is observed the absorption of a drop of a liquid binder by a composition comprising 85% by weight of an atomized ceramic particulate material not subjected to a heat treatment, and 15% by weight of the PVA powder binder. In FIGS. 8E to 8H the absorption of the binder drop is observed for a composition comprising 85% by weight of a heat-treated ceramic particulate material and 15% by weight of the PVA powder binder. It can be seen that the absorption time of the liquid binder droplet decreases considerably for compositions including a heat-treated ceramic particulate material, wherein the advantageous effect of the shorter time for binder absorption is due to the non-deagglomeration of the ceramic particulate materials.

Figure 9:
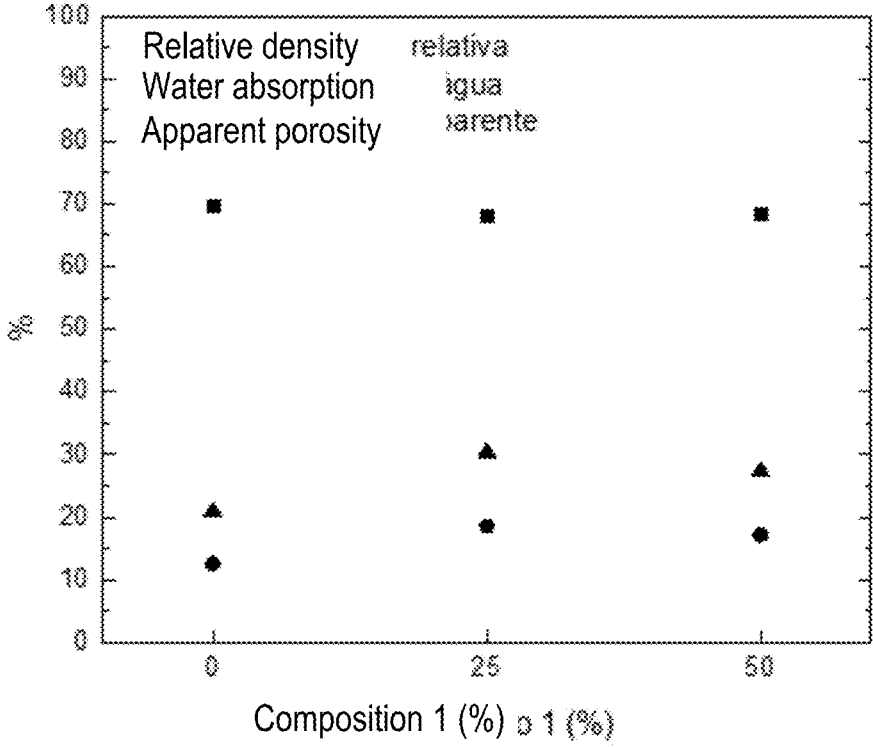
FIG. 9—illustrates analyses of relative density, water absorption and apparent porosity of objects conformed by additive manufacturing by binder jet printing and submitted to a sintering step.

FIG. 9 shows analyses of relative density, water absorption and apparent porosity of objects conformed by additive manufacturing by binder jet printing and submitted to a sintering step. The measured parameters are a function of the proportions of the composition for additive manufacturing by binder jet printing according to the invention. In these specific tests, a composition with 85% by weight of a heat-treated ceramic particulate material and 15% of PVA (composition 1) was used, wherein said composition was mixed with an atomized ceramic particulate material not subjected to a heat treatment and 15% PVA (composition 2) in the mass proportions of 25% of composition 1 and 75% of composition 2; 50% of composition 1 and 50% of composition 2. Based on the results of FIG. 9, it is observed that the values of relative density, water absorption and porosity of the apparent combinations of the conformed and sintered objects are in adequate values, in view of the mechanical resistance necessary for its handling and application, in view of the extreme result referring to a composition with 100% composition 2.

Figure 10:
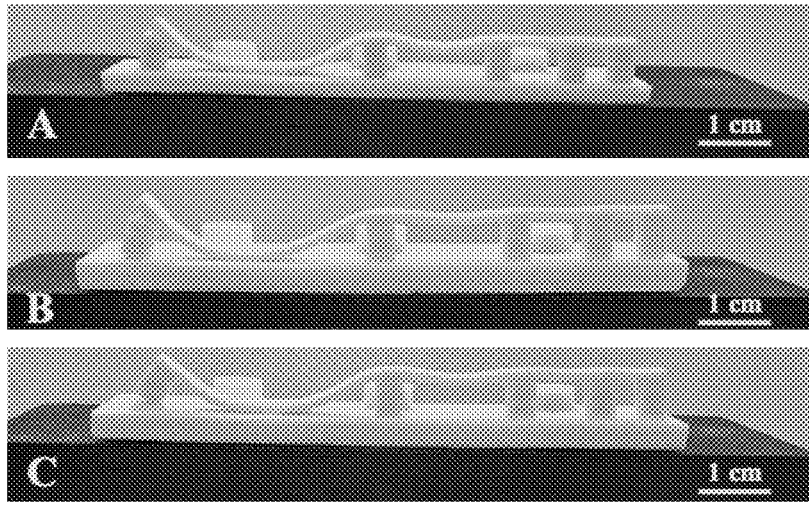
FIG. 10—illustrates objects conformed by additive manufacturing by binder jet printing and submitted to a sintering step.

FIG. 10 shows objects conformed by additive manufacturing by binder jet printing and subjected to a sintering step, from the printing and sintering of: (A) 100% composition 2; (B) 25% composition 1 and 75% composition 2; and (C) 50% composition 1 and 50% composition 2.

Figure 11:
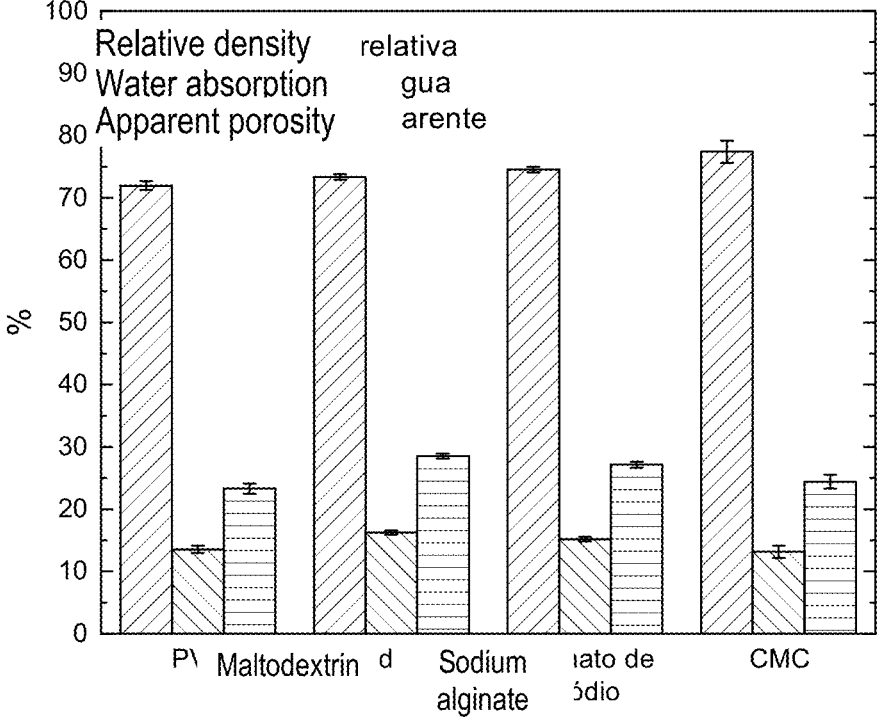
FIG. 11—illustrates results of relative density, water absorption and apparent porosity of objects conformed by additive manufacturing by binder jet printing as a function of the binder particulate material.

FIG. 11 shows results of relative density, water absorption and apparent porosity of objects conformed by additive manufacturing by binder jet printing as a function of binder particulate material. Compositions comprising 95% by weight of an atomized ceramic particulate material not subjected to a heat treatment and 5% of a binder particulate material were used, and the PVA, the maltodextrin, the sodium alginate and the carbomethyl cellulose (CMC) were tested, showing the equivalence of the parameters evaluated for the different types of water-soluble binder particulate material.

As used in this specification, the expressions "about" and "approximately" refer to a range of values plus or minus 10% of the specified number.

As used in this specification, the expression "substantially" means that the actual value is within the range of about 10% of the desired value, variable or related limit, particularly within about 5% of the desired value, variable or related threshold or especially within about 1% of the desired value, variable, or related threshold.

The subject matter described above is provided as an illustration of the present invention and should not be construed as limiting the same. The terminology employed for the purpose of describing specific embodiments according to the present invention should not be interpreted as limiting the invention. As used in the specification, the definite and indefinite articles, in their singular form, are intended to be interpreted as including the plural forms as well, unless the context of the specification explicitly indicates otherwise. It will be understood that the terms "comprise" and "include", when used in this specification, specify the presence of the characteristics, the elements, the components, the steps and the related operations, but do not exclude the possibility that other characteristics, elements, components, steps and operations are also contemplated.

All changes, provided they do not modify the essential features of the claims that follow, are to be considered within the scope of protection of the present invention.

LIST OF REFERENCE INDICATIONS

1. A reservoir of composition for additive manufacturing
2. A fluidizing element
3. A printing roll
4. A printing head
5. A printing bed
6. A conformed object
7. A reservoir of liquid binder

LIST OF QUOTATIONS

Below is the list of quotations:

PATENT LITERATURE

US patent application U.S. Pat. No. 5,204,055 A, published Apr. 20, 1993, to Emanuel Sachs and contributors.

13

The invention claimed is:

1. A composition for additive manufacturing by binder jet printing, comprising a ceramic particulate material subjected to a heat treatment and a particulate binder material; and in that the heat treatment comprises heating a ceramic particulate material in the range of 950 to 1050° C., and for 14 to 16 h to produce the ceramic particulate material subjected to a heat treatment; and in that the binder particulate material is a water-soluble compound;

wherein the binder particulate material is selected from a group consisting of polyvinyl alcohol, polyvinyl alcohol copolymers, sodium alginate, maltodextrin, dextrin, carbomethyl cellulose, starch, sucrose, ammonium phosphate and mixtures thereof.

2. The composition for additive manufacturing by binder jet printing according to claim 1, characterized in that the ceramic particulate material subjected to a heat treatment is selected from a group consisting of alumina, zirconia, zirconium silicate, alumina-zirconia, aluminium-silicates, hydroxyapatite, calcium phosphate, zinc oxide, titanates, clays, carbides and nitrides and mixtures thereof.

3. The composition for additive manufacturing by binder jet printing, according to the claim 2, characterized in that the ceramic particulate material subjected to a heat treatment is at least one of aluminosilicates, aluminas and mixtures thereof.

4. The composition for additive manufacturing by binder jet printing according to claim 1, characterized in that the binder particulate material is at least one of the polyvinyl alcohol, the carbomethyl cellulose, the maltodextrin, sodium alginate and mixtures thereof.

5. The composition for additive manufacturing by binder jet printing according to claim 1, characterized in that it includes the ceramic particulate material subjected to a heat treatment in a proportion from 5 to 95% by mass and the binder particulate material in a proportion from 2.5 to 30% by mass, with respect to the total mass of the composition.

6. The composition for additive manufacturing by binder jet printing according to claim 1, characterized in that it includes the ceramic particulate material subjected to a heat treatment in a proportion from 15 to 75% by mass and the binder particulate material in a proportion from 5 to 20% by mass, with respect to the total mass of the composition.

7. The composition for additive manufacturing by binder jet printing according to claim 6, characterized in that it includes the ceramic particulate material subjected to a heat treatment in a proportion from 25 to 50% by mass and the binder particulate material in a proportion from 7.5 to 15% by mass, with respect to the total mass of the composition.

8. The composition for additive manufacturing by binder jet printing according to claim 1, characterized in that it includes an atomized ceramic particulate material selected from a group consisting of alumina, zirconia, zirconium silicate, alumina-zirconia, aluminium-silicates, hydroxyapatite, calcium phosphate, zinc oxide, titanates, clays, carbides and nitrides and mixtures thereof.

9. The composition for additive manufacturing by binder jet printing according to claim 1, characterized in that it includes the atomized ceramic particulate material in a proportion from 1 to 85% by mass, with respect to the total mass of the composition for additive manufacturing by binder jet printing.

10. A composition for additive manufacturing by binder jet printing, according to claim 1, characterized in that it is obtained from a method of preparation comprising the following steps:

i. Feeding a ceramic particulate material into an oven;

ii. Heating the ceramic particulate material to a temperature in the range of 950 to 1050° C.;

iii. Carrying out the heat treatment of the ceramic particulate material in the range of 950 to 1050° C. for 14 to 16 h;

iv. Cooling the heat-treated material in the previous step, obtaining a ceramic particulate material subjected to a heat treatment;

v. Mixing the ceramic particulate material subjected to a heat treatment with a binder particulate material, which is a water-soluble compound; wherein the binder particulate material is selected from a group consisting of polyvinyl alcohol, polyvinyl alcohol copolymers, sodium alginate, maltodextrin, dextrin, carbomethyl cellulose, starch, sucrose, ammonium phosphate and mixtures thereof.

* * * * *